US005652690A

United States Patent [19]

Mansfield et al.

[11] Patent Number: 5,652,690

[45] Date of Patent: Jul. 29, 1997

[54] LIGHTNING ARRESTER HAVING A DOUBLE ENCLOSURE ASSEMBLY

[75] Inventors: Sean F. Mansfield, Saratoga Springs; Larry E. Bock, S. Glens Falls, both of N.Y.; Ernest T. DeMatties, Poultney, Vt.

[73] Assignee: General Electric Company, New York, N.Y.

[21] Appl. No.: 592,192

[22] Filed: Jan. 26, 1996

[51] Int. Cl.$^6$ ................................ H02H 1/04; H02H 9/04

[52] U.S. Cl. ................................ 361/127; 361/117

[58] Field of Search ................................ 361/111, 117, 361/118, 126, 127, 130

[56] References Cited

U.S. PATENT DOCUMENTS 4,656,555 4/1987 Raudabaugh ............................ 361/117
4,864,456 9/1989 Thuillier et al. ........................ 361/126
4,899,248 2/1990 Raudabaugh ............................ 361/127
4,930,039 5/1990 Woodworth et al. .................. 361/127
4,989,115 1/1991 Bourdages et al. ..................... 361/126
5,363,266 11/1994 Wiseman et al. ....................... 361/127

*Primary Examiner*—Jeffrey A. Gaffin
*Assistant Examiner*—Ronald W. Leja
*Attorney, Agent, or Firm*—Richard A. Menelly; Carl B. Horton

[57] ABSTRACT

A lightning arrester module is double-enclosed to insure adequate environmental protection to the enclosed varistors as well as to contain the internal components of the arrester upon severe fault conditions. The internal components including the varistors are compressed within one half section of the inner enclosure and can be handled and tested without disengagement. The other half section of the inner enclosure is positioned over the internal components to complete the inner enclosure before the outer enclosure is arranged thereover to complete the lightning arrester module assembly.

7 Claims, 5 Drawing Sheets

LIGHTNING ARRESTER HAVING A DOUBLE ENCLOSURE ASSEMBLY

BACKGROUND OF THE INVENTION

Lightning arresters in the form of mental oxide varistor discs are used to protect electrical equipment and personnel from overvoltage surges usually caused by lightning. The varistors are arranged within electrically-insulative enclosures singularly or in a stacked array to provide an electrical series circuit whereby the clamping voltage of the arrester is determined by the series addition of the individual varistor clamping voltages.

To provide good electrical connection between the varistors within the stacked array, the varistors are often bound together by polymer filaments prior to insertion within the enclosures and compression springs are positioned at one or both ends to provide compressive forces to the varistors to insure good electrical connection. Spring washers and the like are also positioned between the varistors to provide additional compressive forces for enhanced electrical connection. U.S. Pat. Nos. 4,656,555 and 4,864,456 describe the use of filament windings and compression springs to improve electrical connection between the varistors per se as well as between the varistors and the arrester end terminals. To prevent the build-up of gases during the occurrence of an overvoltage condition, the immediate enclosures are often vented to allow egress of the ionized gases and prevent over-pressure buildup. One example of a lightning arrester having a vented enclosure is found in U.S. Pat. No. 4,930,039.

One purpose of the invention is to provide a double enclosure lightning arrester assembly and handling procedures and strength integrity upon failure condition. Additionally, the double enclosure provides a means of spring loading the varistors to insure good electrical contact. The double enclosure thereby insures good electrical connection between the enclosed varistors as well as providing secure containment of parts within a split cylinder polymer casing. The polymers casing and subassembly is inserted within the main polymer outer enclosure and the entire assembly is bolted together. The resultant lightning arrester exhibits good electrical conduction between the varistors and containment of internal components in case of arrester failure and subsequent fault current conditions.

SUMMARY OF THE INVENTION

A lightning arrester sub-assembly consisting of the varistors, compression spring and end plugs is first arranged within a split cylinder polymer casing. The polymer casing and subassembly is inserted within the main polymer outer enclosure and the entire assembly is bolted together. The resultant lightning arrester exhibits good electrical conduction between the varistors and containment of internal components in case of arrester failure and subsequent fault current conditions.

DESCRIPTION OF THE PREFERRED EMBODIMENT

Figure 1:
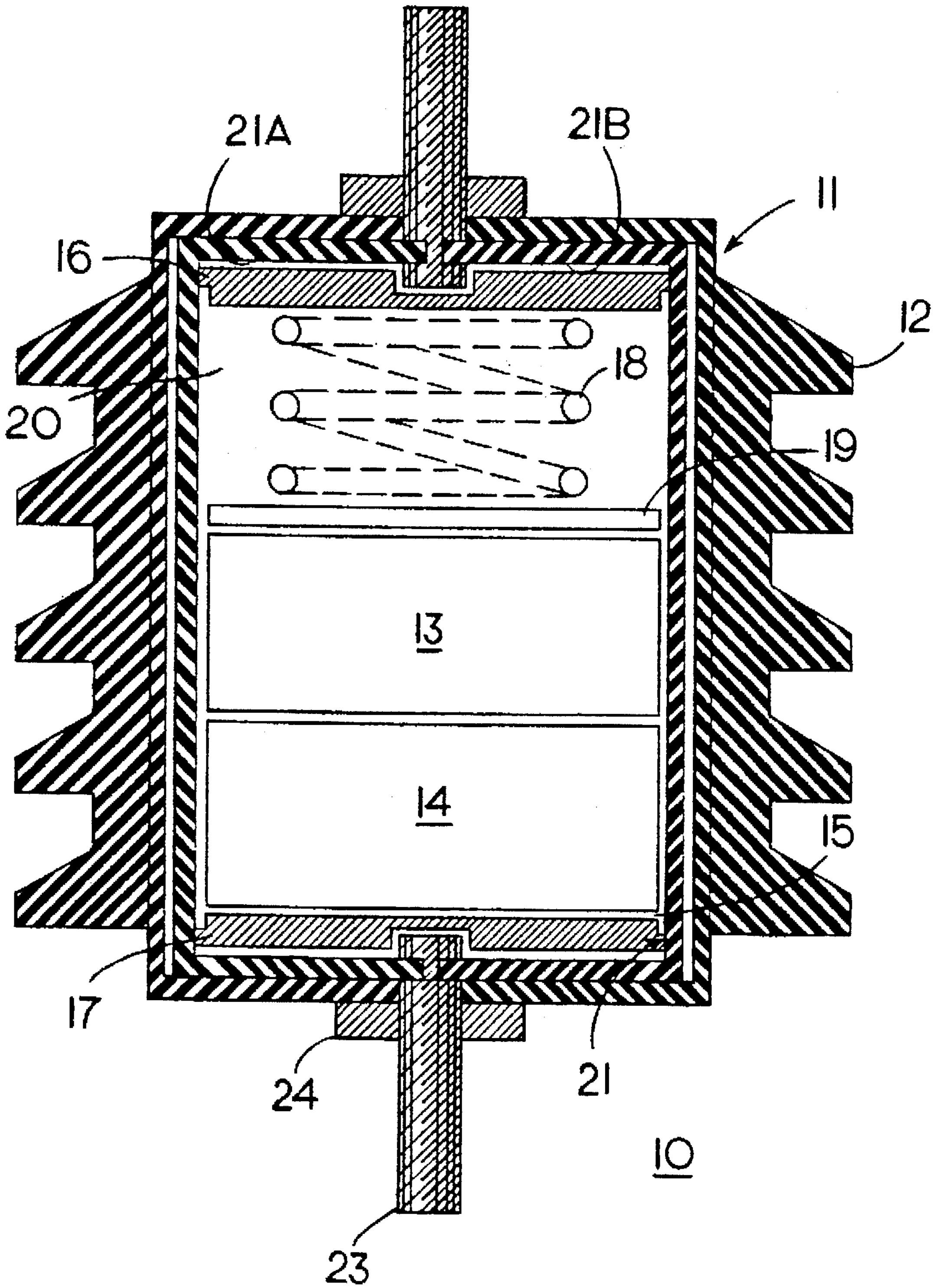
FIG. 1 is a front sectional view of the double enclosure lightning arrester according to the invention.

The double enclosure lightning arrester 10 is shown in FIG. 1 to consist of an outer polymer housing 11 shaped to provide an overhanging watershed exterior as indicated generally at 12. A pair of split polymer cylinders 21A, 21 B house the inner components which include the zinc oxide varistors 13. 14, compression spring 18, spring plate 19 and end plugs 16, 17. A pair of varistor discs are depicted in the FIGURE, however the arrester assembly may use one or more discs in the same general configuration. Electrical connection between the varistors per se as well as between the arresters and the end plugs is provided by the conductive coating 15 that is applied to both surfaces of each varistor at the time of manufacture described below in greater detail. The subassembly consisting of the end plugs, spring and varistors is first installed within the split polymer cylinders for ease in handling and assembly.

Figure 2:
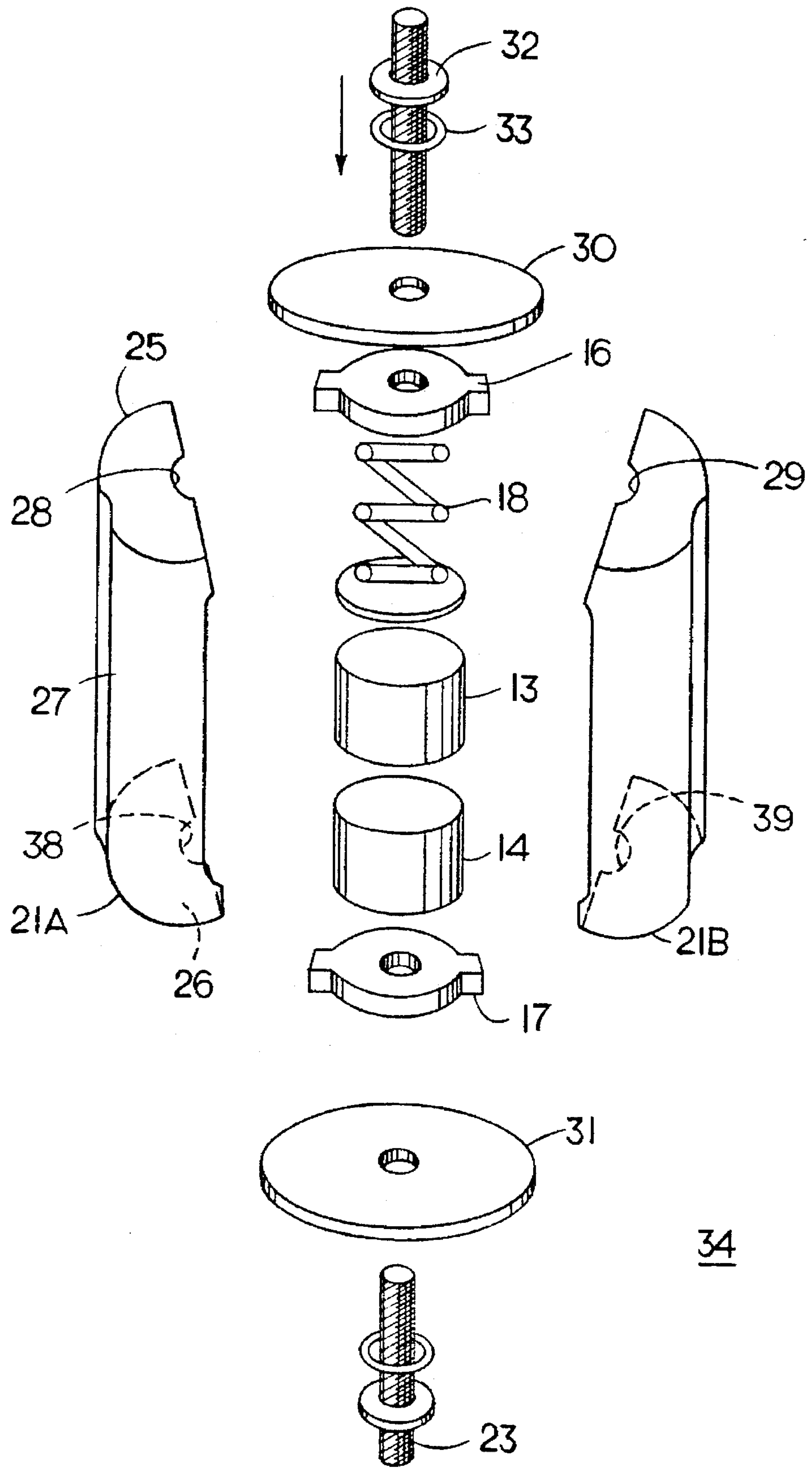
FIG. 2 is a top perspective view of the lightning arrester components in isometric projection prior to assembly.
Figure 4:
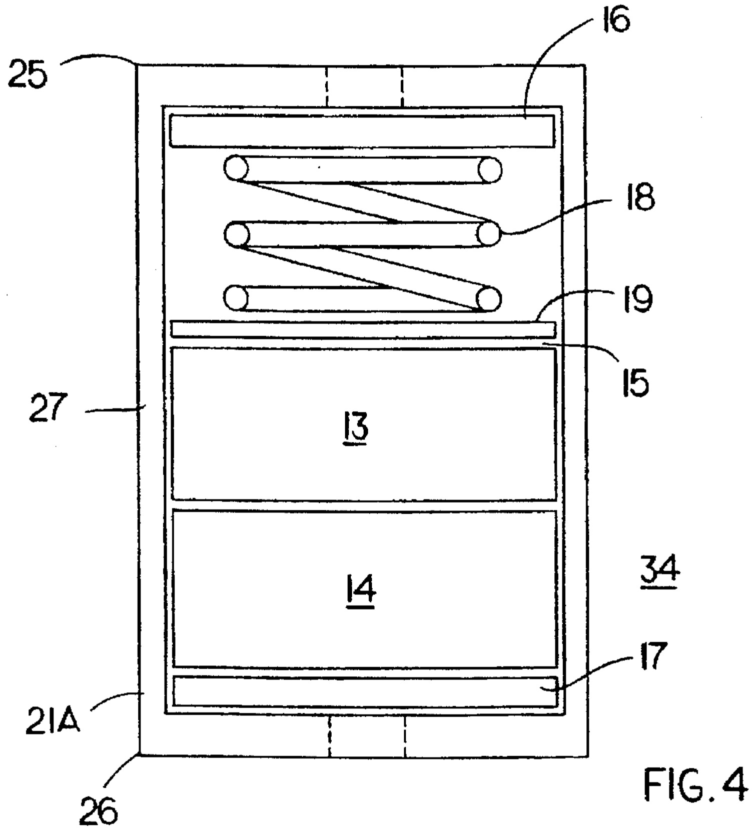
FIG. 4 is a front plan view of the split cylinder inner enclosure of FIG. 3 containing the lightning arrester components as a sub-assembly.

FIG. 2 shows the subassembly 34 with the varistors 13, 14 compression spring 18 and end plugs 16, 17 intermediate the split polymer cylinders 21 A, 21 B. The split polymer cylinders each comprise a generally semicircular top 25 and bottom 26 with radial openings 28, 29 and 38, 39 formed therein to accommodate the bolts 23 provided at opposite ends of the subassembly facilitate the flow of potting compound around the enclosure to eliminate free air space. Lack of free air space is important to reduce the potential of moisture ingress which can result in electrical failure. Once the internal components are positioned within one of the split polymer cylinders 21A or 21 B, as indicated in FIG. 4, the subassembly is completed by arranging the opposite split polymer cylinder, 21 A or 21 B to complete the subassembly. Fiberglass tape wrapped around the two split cylinders then makes the subassembly easily handled for transport on automated assembly and testing before positioning the end caps 30,31 on opposite ends thereof and inserting the bolts 23, washers 32 and O-rings 33.

Figure 3:
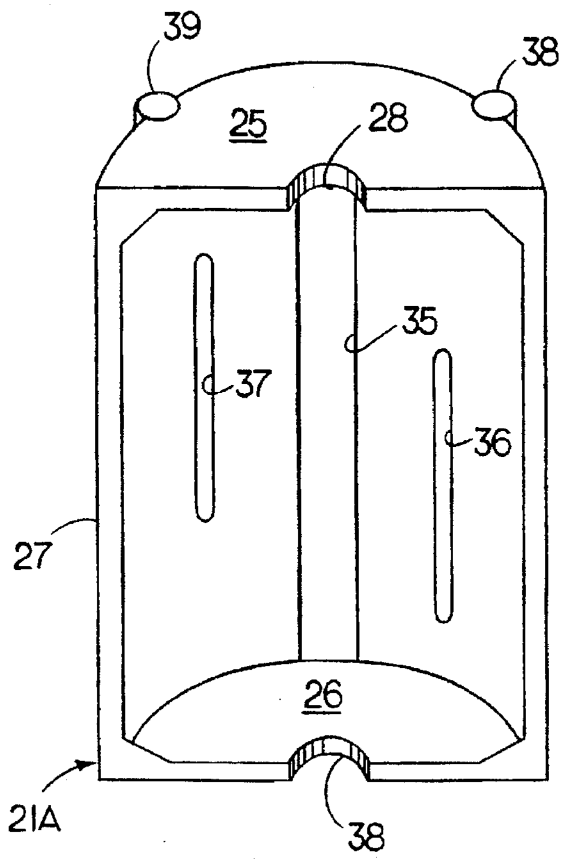
FIG. 3 is a front perspective view of one half of the split cylinder inner enclosure used with the lightning arrester of FIG. 1.

One of the split polymer cylinders 21A is depicted in FIG. 3 to detail the structural features of the cylindrical wall 27. A pair of interior ribs 36,37 are integrally-formed within the polymer material along with a pair of exterior ribs 38,39 which can consist of the polymer composition or comprise supplemental glass or nylon fibers. These ribs serve to center the varistor disks within the split cylinders and center the interior assembly within the exterior housing. An elongate slot 35 formed within the cylindrical wall 27 provides mechanical stress and pressure relief. The provision of the semicircular top and bottom walls integral with the cylindrical wall 27 is an important feature of the invention since they provide means for compression of spring 18, as well as help to restrain the internal components from vertical displacement during intense internal pressure conditions associated with arrester failure. The split cylinders are dimensioned such that when they are joined in the final assembly there is a longitudinal gap between cylinders, said gaps performing the same bolts functions as the elongate slot 35.

The arrangement of the internal components within the split polymer cylinder 21A to form the subassembly 34 prior to insertion into the exterior housing 11 of FIG. 1 is depicted in FIG. 4. The tight fit afforded between the semicircular top 25, end plug 16 and the compression spring 18 at the top of the subassembly is carried between the spring plate 19 and the conductive coatings 15 on the varistors 13,14 to the end plug 17 against the semicircular bottom 26 by virtue of the bias provided by the compression spring. The overall effect of the split cylinder housings of the invention is to effectively increase the mechanical withstand of the outer polymer enclosure for greater overall strength to the lightning arrester when the varistors contained therein biased together by means of a compression spring according to the instant invention.

Figure 5:
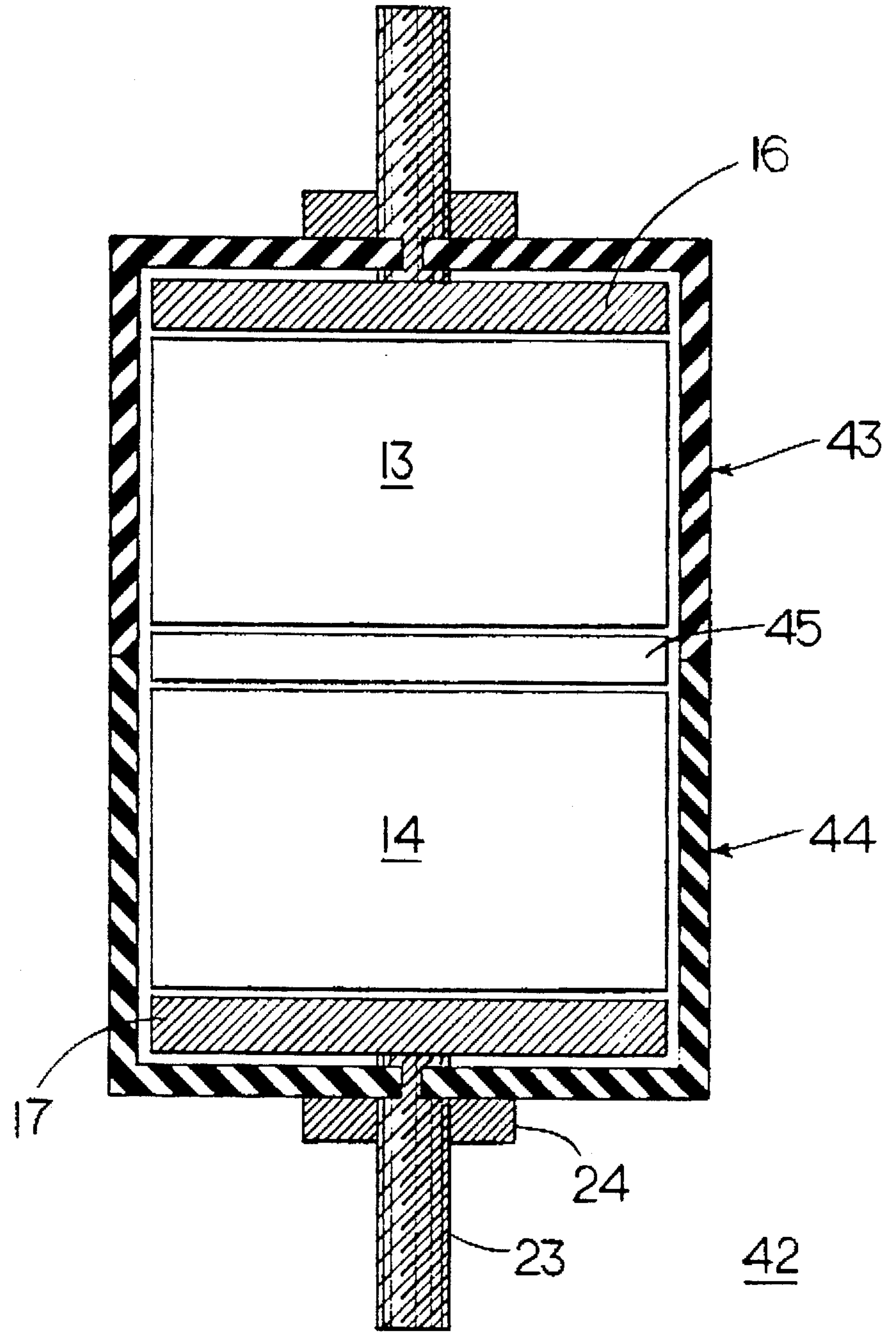
FIG. 5 is a front plan view of a further split cylinder inner enclosure containing the lightning arrester components as a sub-assembly.

A further subassembly 42 is depicted in FIG. 5 whereby the compression spring 18, shown earlier is eliminated and compression is provided to the varistors 13, 14 by means of threaded top and bottom cylinders 43, 44 of the same material of the split cylinders 21A, 21B shown earlier. A planar compression washer 45 is arranged between the varistors to enhance electrical transfer between the varistors and end plates 16, 17 are arranged at the ends thereof for external electrical connection, as described earlier. The top and bottom cylinders are threaded together, and nuts 24 are attached to the bolts 23 extending from the top and bottom cylinders. The variable assembly length provided by the threads eliminates the need for costly spacers sometimes required as the number of size of varistor disks changes.

Figure 6:
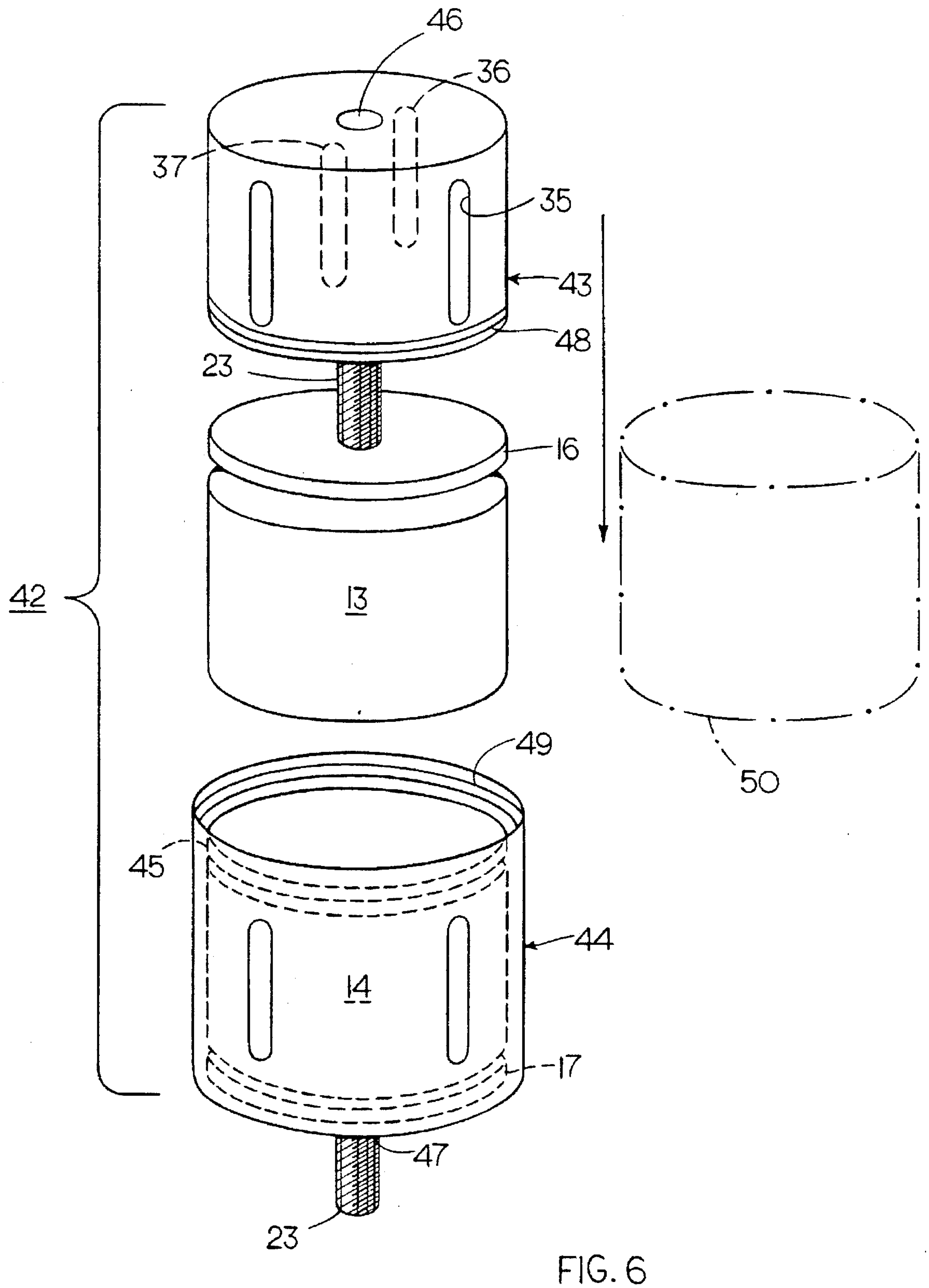
FIG. 6 is a top perspective view of the lightning arrester components of FIG. 5 in isometric projection prior to assembly.

The subassembly 42 is shown in FIG. 6 to show the arrangement amenable to robotic assembly. The end plate 17 is first positioned in the bottom cylinder 44 and arranged such that the bolt 23 extends through the bottom opening 47. The varistor 14 is next positioned over the end plate and the compression washer 45 is arranged on the top surface of the varistor 14 with clearance provided for access to the internal threads 49. The varistor 13 is next positioned over the compression washer and the end plate is positioned on the top surface of the varistor 13 and arranged such that the bolt 23 extends through the top opening 46 when the external threads 48 on the top cylinder 43 engage the internal threads 49 on the bottom cylinder 44 to fasten the cylinders together and to tightly compress the compression washer 45 therebetween. In a similar manner as described earlier, interior ribs 36 and elongated slots 35 are provided on both the top and bottom cylinders. A double-ended cylinder 50, as depicted in phantom is hollow at both ends and complimentary threaded to interface between the top and bottom cylinders 43, 44 and is employed when additional varistors are required.

We claim:

1. A high voltage surge arrester comprising:

a first varistor having an electrically conductive coating on opposite sides thereof;

a first metallic end plug contacting one side of said first varistor providing electrical connection with said one side of said first varistor;

a compression spring on an opposite side of said first varistor providing a compressive force on said first varistor and electrical connection with said opposite side;

a second metallic plug on said opposite side of said first varistor in abutment with said compression spring providing electrical connection with said compression spring;

a top cylinder of electrically-insulative material partially encompassing said first varistor, said first and second metallic plugs and said compression spring;

a bottom cylinder of electrically-insulative material partially encompassing said first varistor, said first and second metallic plugs and said compression spring, said bottom cylinder being attached to said top cylinder; and a second varistor separated from said first varistor by said compression spring within said top and bottom cylinders.

2. The arrester of claim 1 wherein said open end is threaded.

3. The arrester of claim 2, wherein said open end of said top cylinder is externally threaded.

4. The arrester of claim 2, wherein said open end of said bottom cylinder is internally threaded.

5. The arrester of claim 1 including a center cylinder intermediate said top and bottom cylinders, said center cylinder being open at both ends thereof.

6. The arrester of claim 5, wherein said center cylinder is threaded at both ends thereof.

7. The arrester of claim 1 wherein said compression spring comprises a compression washer.

* * * * *